United States Patent
Land, III et al.

(10) Patent No.: US 7,806,000 B2
(45) Date of Patent: Oct. 5, 2010

(54) SENSOR FOR DETECTING ARCING FAULTS

(75) Inventors: H. Bruce Land, III, Laurel, MD (US);
Kim R. Fowler, Windsor Mill, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 12/371,030

(22) Filed: Feb. 13, 2009

(65) Prior Publication Data

US 2009/0193901 A1   Aug. 6, 2009

Related U.S. Application Data

(62) Division of application No. 11/488,264, filed on Jul. 18, 2006, now Pat. No. 7,536,914.

(60) Provisional application No. 60/700,069, filed on Jul. 18, 2005.

(51) Int. Cl.
*G01L 9/00*   (2006.01)
(52) U.S. Cl. .......................... 73/705; 361/24
(58) Field of Classification Search .......... None
See application file for complete search history.

(56) References Cited

U.S. PATENT DOCUMENTS

| | | | |
|---|---|---|---|
| 4,067,052 A | 1/1978 | Neuhoff et al. | |
| 4,402,054 A | 8/1983 | Osborne et al. | |
| 4,785,288 A | 11/1988 | Heberlein, Jr. et al. | |
| 4,878,144 A | 10/1989 | Nebon et al. | |
| 5,486,811 A | 1/1996 | Wehrle et al. | |
| 5,650,902 A | 7/1997 | Herkenrath et al. | |
| 5,933,308 A | 8/1999 | Garzon | |
| 6,141,192 A | 10/2000 | Garzon | |
| 6,229,680 B1 | 5/2001 | Shea | |
| 6,421,214 B1 | 7/2002 | Packard et al. | |
| 6,426,634 B1 | 7/2002 | Clunn et al. | |
| 6,456,471 B1 | 9/2002 | Haun et al. | |
| 6,693,438 B2 | 2/2004 | Shea | |
| 6,696,939 B2 | 2/2004 | Schneider et al. | |
| 7,035,068 B2 | 4/2006 | Shea | |
| 7,583,390 B2 * | 9/2009 | Carr | 356/519 |
| 2002/0125892 A1 | 9/2002 | Parker et al. | |
| 2004/0054921 A1 | 3/2004 | Land, III | |
| 2005/0041905 A1 * | 2/2005 | Lagakos et al. | 385/12 |
| 2005/0122643 A1 | 6/2005 | Shea | |
| 2006/0196273 A1 * | 9/2006 | Burns | 73/702 |
| 2009/0153144 A1 * | 6/2009 | Hansen | 324/511 |
| 2009/0202195 A1 * | 8/2009 | Lagakos et al. | 385/13 |

FOREIGN PATENT DOCUMENTS

JP   2002281621 A   9/2002

\* cited by examiner

*Primary Examiner*—Andre J Allen
(74) *Attorney, Agent, or Firm*—Aisha Ahmad (57) ABSTRACT

The present invention is directed to a sensor for detecting arcing faults, the sensor combining a photodetector, a pressure detector, and an accelerometer along with integrated circuitry. The circuitry controls each detector, operates the self-test circuitry, conditions the signals from the detectors, and communicates with the external network. The circuitry receives commands from the network and transmits the output decision from the sensor.

9 Claims, 10 Drawing Sheets

SENSOR FOR DETECTING ARCING FAULTS

CROSS-REFERENCE TO RELATED APPLICATIONS

This application is a divisional of application Ser. No. 11/488,264 entitled, "Sensor for Detecting Arcing Faults," filed on Jul. 18, 2006 now U.S. Pat. No. 7,536,914 by H. Bruce Land III and Kim R. Fowler and is related to U.S. Provisional Application No. 60/700,069, entitled "Integrated Sensor With Photodetector, Pressure Detector, Accelerometer, and Circuitry for Detecting Arcing Faults," filed on Jul. 18, 2005, both of which are incorporated herein by reference in their entirety.

BACKGROUND OF THE INVENTION

1. Field of the Invention

The present invention relates to an integrated multifunctional sensor for detecting arcing faults. More specifically, it relates an integrated multifunctional sensor for detecting arcing faults, which combines multiple detection phenomenologies to achieve high probability of detection and low false alarm rate.

2. Description of the Related Art

Arcing faults are essentially high-impedance short circuits in power supply systems. In more precise language, an arcing fault may be defined as a variable impedance sustained luminous discharge of electrical power across a gap in a circuit. These discharges conduct sufficient current to sustain an arc but remain below the trip threshold of circuit breakers. They typically start as inline high-resistance caused by a dirty or loose connection; this situation may be sustained for days or weeks. The heat from the faulty connection eventually melts the connection causing an in-line arc. The in-line arc then jumps phase to generate white-hot heat that melts and consumes the metal in switchgear in a few seconds.

An arc generates a searingly bright, white-hot light and a pressure shockwave. An arc also generates high-frequency harmonics on the power lines. Detectable arcs dissipate a significant amount of power. The current of an arc depends on the voltage available and the spacing of the conductors. While arcs can occur at household voltages and currents, these arcs do most of their damage due to the ignition of adjacent combustible material and are not the focus of this disclosure. Arcs in main power distribution centers occur at voltages of 400 V and above and disable the distribution centers due to bulk vaporization of metals. The power distribution center arcs are the main focus of this disclosure.

The rise time of an arc is in the nanosecond range. It generates light and high-frequency harmonics immediately. A shockwave travels at the speed of sound or about 340 m/s, and takes about 2.94 milliseconds to travel one meter from the arc. An arc sustained for a few hundred milliseconds begins to combust and to destroy copper and steel in power distribution switchboards. Testing has shown that if the arc is quenched within 250 milliseconds then the damage will not generally require the replacement of components of the switchboard. If the arc time extends to one second then collateral damage can include holes in the sheet metal wall of the switchboard. This defines a range of time between about 1 and 200 milliseconds within which a protective system must detect, discriminate and extinguish an arc before significant damage occurs.

Dirty and loose connections often are the genesis for arcing faults. The conditions for an arcing fault often take some time to develop. As dirt accumulates and connections loosen the circuit increases in resistivity; this, in turn, generates heat. The heat will bake off particulates of insulation from the conductors.

There are presently a variety of techniques and systems for detecting arcing faults. Below are listed the main techniques along with their deficiencies.

Arc-proof switchboards contain the damage but do not prevent it. They are constructed from heavier steel to reduce the likelihood of flying debris and they contain pressure relief panels in the top of the switchboards to vent the hot arc gases away from direct impingement upon personnel. Their high purchase price, high installation costs and the down time needed to install them, make arc-proof switchboards too expensive for use in existing installations.

Multi-function monitoring (MFM) works by attaching current transformers on every major cable entering or leaving a switchboard or a network of switchboards. A smart box sums all of the currents entering or leaving a circuit node. Any missing current is evidence of an arc and results in opening the protective breakers. Alternatively MFM systems sometimes look at noise on the power line or at the absolute value of the currents compared to some reference value. While these systems can be effective with cable arcs, they are much less effective on bus bars due to the wide variation in impedance bus bar geometries. Additionally in dense switchboard groups the wide range in size of loads makes it difficult to discriminate the currents lost to loads vs. that lost to an arc.

Current relay techniques have a long history in the electrical industry. Current transformers are attached to major conductors and then connected to the appropriate relays. If the currents in the various conductors of the circuit are out of a predefined balance the circuit is interrupted by the relays. This scheme can be useful to insuring a balance in the current between multiple loads but they have not proven to be effective against arcing. Additionally, consider that the current transformers and relays required for current relaying and for the MFM require that bulky expensive components be added to already cramped switchboards.

Arc fault circuit interrupters (AFCI) are useful only on low voltage circuits with amperage less than 20 A. AFCIs work by looking at the frequency, duration, or pulsing of high frequency noise on a circuit due to low power sputtering arcs. While AFCIs work in household environments, they incur problems with discrimination between the noise from bad arcs and that of normal arcs due to switch openings, filaments blowing, hair dryers, etc. Manufacturers of AFCI generally believe that due to the discrimination issues AFCIs will never work at higher voltages or in an industrial environment.

ABB arc guard system has optical fiber technology coupled with or without current detection. Coupling the optical signal with a current threshold can cause the system to miss smaller arcs. The use of fiber optics restricts the angle of view of the sensors and worsens the sensitivity for smaller arcs. This system has no Built-In Test (BIT) capability; therefore one can not be sure that the system is on line and functioning correctly. It is geared to protecting individual switchboards and may not be set up to look at large switchboard networks in zone-oriented schemes. The arc guard system may also have no predictive capability.

Thermal imaging of electrical switchboards can identify faulty connections and components and direct preventive maintenance; unfortunately typically less than half of all connections are in view of the thermal imaging operator. Thermal imaging is only effective if performed while the switchboards are energized and up to their normal operating temperature. Thus the process requires working on energized switchboards which is difficult to perform and presents a safety hazard. Due to costs, thermal imaging is only done every one-two years; however it can only look forward a few days.

The Continuous Thermal Monitoring System (CTM) can prevent arcing faults due to overheated connections by the detection of pyrolysis products from the overheated connections. A CTM indications directs the operator to perform preventative maintenance in a given switchboard before an arc occurs. This system is not effective against arcs caused by contamination or falling objects.

A related patent is U.S. Pat. No. 4,658,322 Arcing Fault Detector, by Neftali Rivera. The arcing fault detection system disclosed in this patent comprises a plurality of temperature sensors and a differential pressure sensor, with their intelligence being processed by a fault protector which controls the tripping of the circuit breaker(s). This patent further discloses the optional use of photodiode(s), which may be used with or in place of the temperature sensors to detect light generated by an arc fault. While the system disclosed in this patent is capable of detecting arcing faults which are accompanied by pressure, temperature and/or light, the system has a high false alarm rate and other deficiencies.

In summary, while these sensors accomplish their intended purposes, their numerous serious deficiencies have been noted above, and there remains a strong need for an arcing fault detection system which has both a high probability of detection and a low false alarm rate for a broad range of amperages and fault-types, thus addressing and solving problems associated with conventional systems.

SUMMARY OF THE INVENTION

The present invention is directed to a sensor for detecting arcing faults, the sensor combining a photodetector, a pressure detector, and an accelerometer along with integrated circuitry. The circuitry controls each detector, operates the self-test circuitry, conditions the signals from the detectors, and communicates with the external network. The circuitry receives commands from the network and transmits the output decision from the sensor. This approach allows a combination of high probability of detection and low false alarm rate which surpasses that attainable by conventional systems.

It is an object of the invention disclosed herein to provide a new and improved sensor for detecting arcing faults, which provides novel utility and flexibility through the use of a unique design which allows the sensor to achieve a high probability of detection along with a low false alarm rate.

It is another object of the invention disclosed herein to improve the early detection of arc faults in advance to help save lives.

It is another objection of the invention disclosed herein to improve the early detection of arc faults to save systems explosions and costly repairs and replacement of equipment.

It is another object of the invention disclosed herein to provide a new and improved sensor for detecting arcing faults, which would approach arc detection from a system level that would avoid the cascading of arcing failures through large groups of switchboards; causing massive blackouts such as evidenced in the Chicago Loop, New York City, and Wall Street.

It is another object of the invention disclosed herein to present arc fault detection which contains built-in-test functions that assure that the protection is fully functional and on line at the time of need.

It is another object of the invention disclose herein to present a multi-parametric sensor whose performance can be tailored for optimal arc detection in a wide variety of environments.

It is an advantage of the invention disclosed herein to provide a new and improved sensor for detecting arcing faults, which is inexpensive and can be applied easily to existing installations.

These and other objects and advantages of the present invention will be fully apparent from the following description, when taken in connection with the annexed drawings.

BRIEF DESCRIPTION OF THE DRAWINGS

The teachings of the present invention can be readily understood by considering the following detailed description in conjunction with the accompanying drawings, in which.

DETAILED DESCRIPTION OF EXEMPLARY EMBODIMENTS

Figure 1:
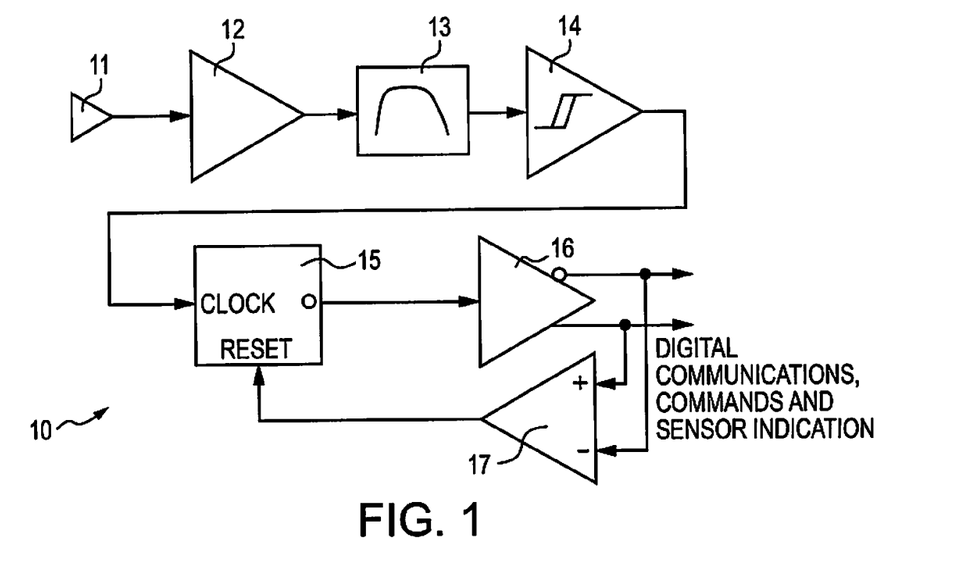
FIG. 1 is a diagram showing an example of functional components for a photosensor.

Referring now to the drawings in greater detail, FIG. 1 is a diagram showing example functional components for a photosensor. Photosensor 10 is shown with photodetector 11, amplifier 12, filter 13, threshold limiter 14, flipflop/storage/memory element 15, communications transmitter 16 and differential driver/receiver 17.

Figure 2:
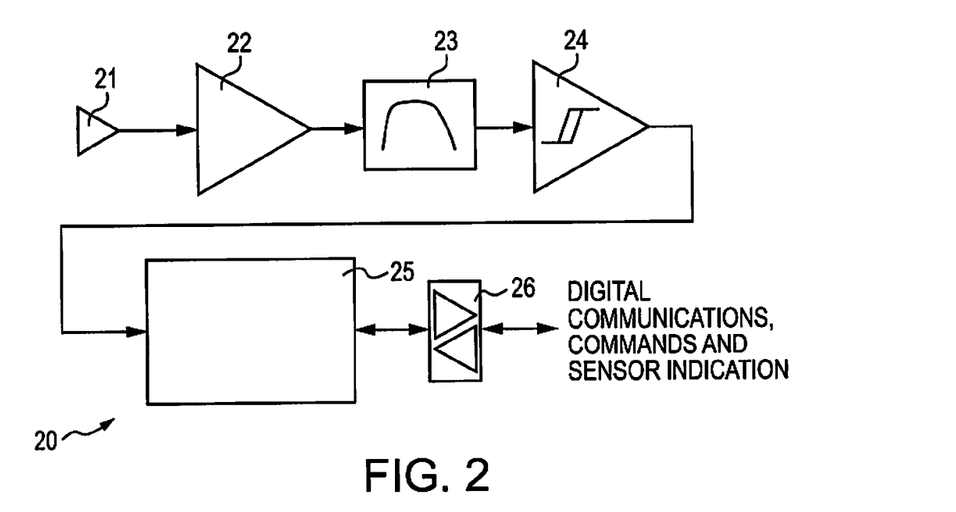
FIG. 2 is another diagram showing an example of functional components for a photosensor.

FIG. 2 is a diagram showing another possible configuration for a photosensor. Photosensor 20 is a more sophisticated photosensor with built-in circuitry for generating complex communication protocols and timing. Photosensor 20 is shown with photodetector 21, amplifier 22, filter 23 and threshold limiter 24. Threshold limiter 24 is shown connected to microcontroller 25. Note that microcontroller 25 could also be a DSP or FPGA or ASIC for controlling the photosensor and communicating with the central node or network. Microcontroller 25 may include algorithms for timeout durations. Microcontroller 25 is connected to differential transceiver 26.

Photosensors 10 and 20 of FIGS. 1 and 2 respectively are easily configured for BIT and BIST, although the circuit details for including BIT and BIST have not been explicitly illustrated in FIGS. 1 and 2. Further, these sensors can easily connect to any type of network or central processing system or an embedded system for protecting power switchboards against arcing faults. They fit into either a centralized architecture such as the star-topology connections or a distributed architecture such as a network.

Figure 3:
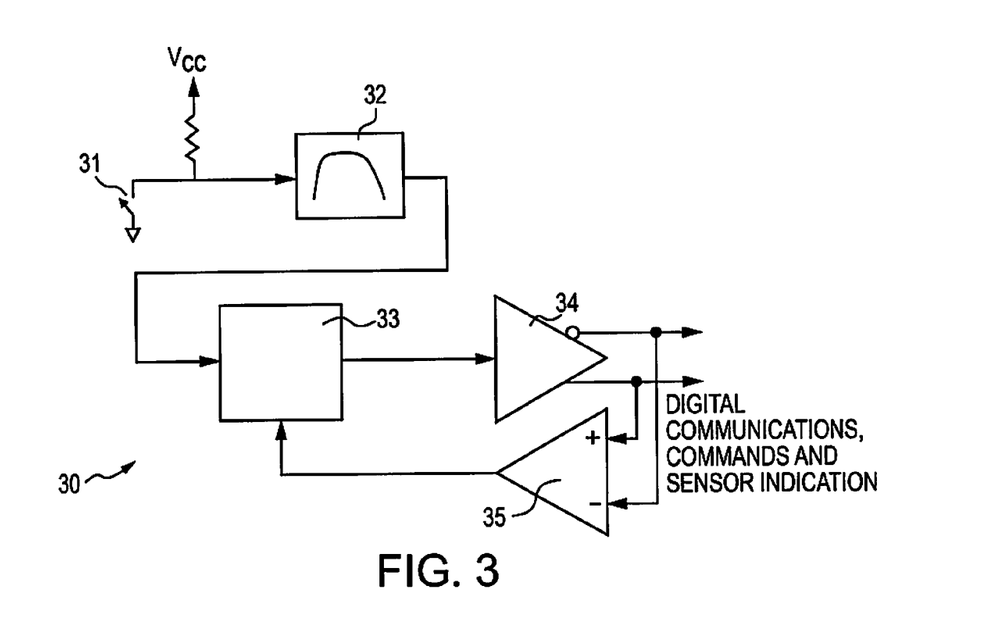
FIG. 3 is a diagram showing an example of functional components for a pressure sensor.
Figure 4:
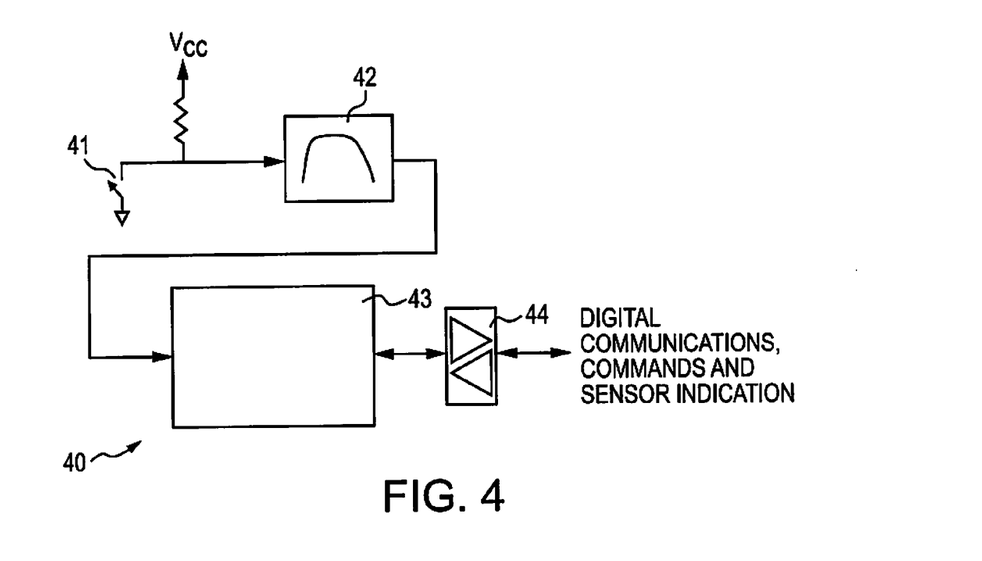
FIG. 4 is another diagram showing an example of functional components for a pressure sensor.

FIGS. 3 and 4 are diagrams showing example functional components for pressure sensors 30 and 40, respectively. In FIG. 3, pressure sensor 30 is shown with pressure-activated switch 31 (though a strain gauge may be used as well), filter or debounce circuit 32, a flipflop/storage/memory element 33, a transmitter 34 and differential driver/receiver 35. In FIG. 4, pressure sensor 40 is shown with pressure-activated switch 41 (though a strain gauge may be used as well), filter or debounce circuit 42 and microcontroller 43 (microcontroller 43 could also be a DSP or FPGA or ASIC for controlling the photosensor and communicating with the central node or network). Microcontroller 43 includes algorithms for timeout durations. Microcontroller 43 is connected to differential transceiver 44.

Figure 5:
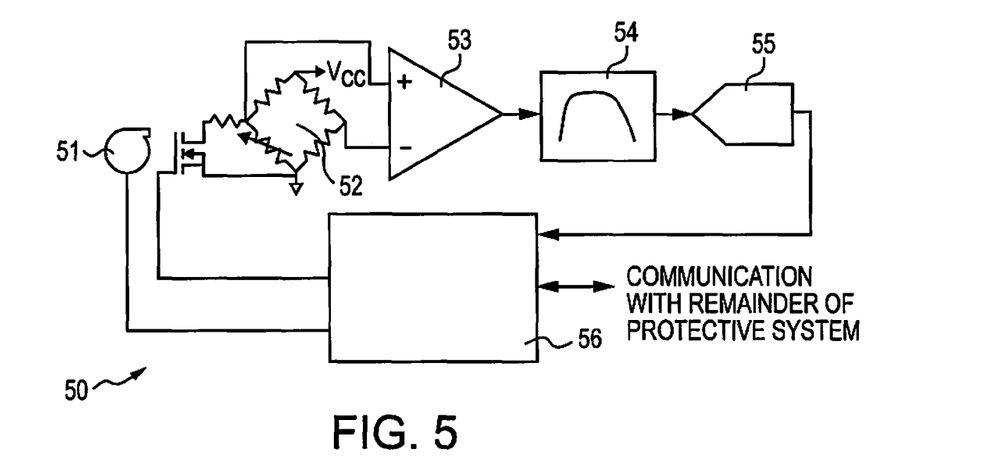
FIG. 5 is a third diagram showing an example of functional components for a pressure sensor.

FIG. 5 is a diagram of example functional components for pressure sensor 50 that uses a strain gauge element. Pressure pump 51 is used to supply a test pressure to the strain gauge element upon command. A similar pressure pump or fan can be use with the pressure switch 31 of FIG. 3 or 41 of FIG. 4. Its advantage is that it tests the mechanism of the switch or strain gauge as well as the associated electronics. The disadvantage is the added complexity. Shorting across the switch or strain element is a simple way to perform a test of the electrical components, but its disadvantage is that it does not test the mechanism of the switch. This application also supplies a filter/debounce circuit.

Figure 6:
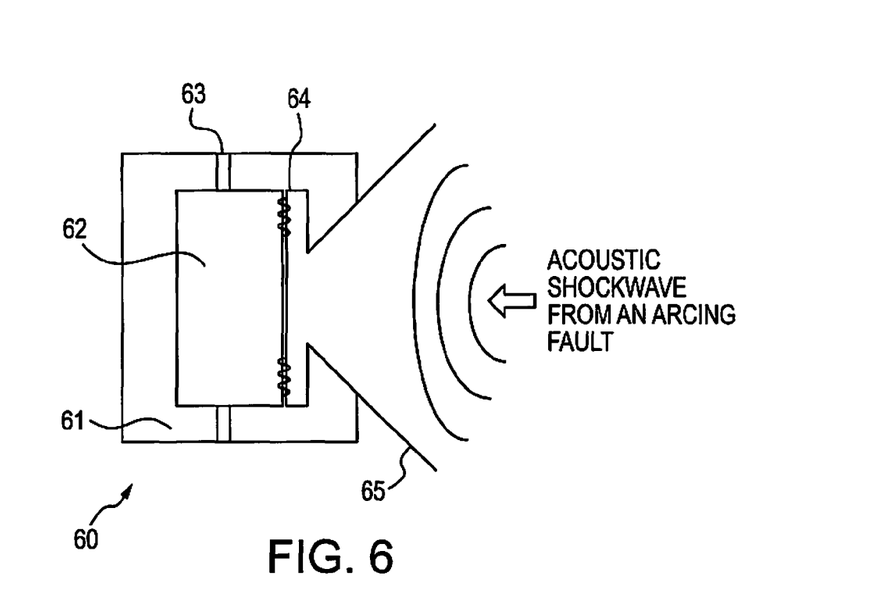
FIG. 6 is a fourth diagram showing an example of functional components for a pressure sensor.

FIG. 6 illustrates example components in a more sophisticated pressure sensor. More sophisticated pressure sensors have built-in circuitry for generating complex communication protocols and timing. FIG. 6 is a diagram showing micromechanical (MEMS) embodiment 60 of a pressure sensor, with an entry nozzle and a pressure detector configuration. An ordinary pressure sensor or pressure switch may not properly respond to the high frequency pressure generated by an arc. This pressure is a shockwave with both a very sharp transient pressure wave and a high frequency alternating pressure. Therefore, this application provides a pneumatic rectifier 65 to pneumatically smooth the pressure seen by the switch or strain gauge. Funnel-shaped entry nozzle 65 is affixed to the input to the pressure sensor such that the large end of nozzle 65 faces the potential arc and the pressure from the arc is forced through the small end of nozzle 65 into a small cavity in front of pressure sensing diaphragm 64. Diaphragm 64 includes a strain gauge or built-in switch (not shown) to detect flexures from pressure changes. This combination smoothes the rapidly-varying pressure from the arc and allows the pressure detector to perform correctly. Note that the principles of the present application may be applied to a wide variety of designs for entry nozzle 65, hence the specific configuration shown in FIG. 6 is not intended to limit the scope of this application. Ambient chamber 62 is shown relatively large compared to the front-side chamber and provides a transient reference for differential pressure measurements. Ambient pressure bleed tube 63 protrudes from ambient chamber 62 for adjusting pressure levels. Substrate 61 is composed of bulk silicon or other material. Substrate 61 provides a mounting surface and also contains readout and signal conditioning and processing circuitry.

Pressure sensors require acute sensitivity to detect an arc before critical damage is done to the switchboard. Unfortunately, changes in barometric pressure may cause the pressure detector to erroneously report the presence of an arc. This problem can be remedied by any one of the following three methods: First, a differential pressure sensor can be used to compare the pressure inside the switch board to that outside of the switch board. If the inside pressure is higher than the outside pressure an arc is likely present. The disadvantage of the method is that it requires drilling a hole in the surface of the switch board.

The second method requires the use of a differential pressure sensor. Here a small hole vents a cavity attached to the back side of the pressure diaphragm. Barometric pressure changes occur slowly and both sides of the diaphragm will thus see the same pressure. No false signal will be created. If an arc occurs, the air flow from the shockwave of an arc will enter the front side more readily than the back side and thus correctly read the rise in pressure caused by the arc. The small vent holes in the back side cavity present a greater pneumatic resistance to air flow that accompanies the shockwave of an arc, consequently pressure will build up more slowly in the back side cavity than in front of the diaphragm.

The third method uses an analog-to-digital converter (ADC) and a microcontroller chip to measure the pressure continuously inside the switch board. By monitoring the rate of change in pressure, the microcontroller will easily discriminate between the slow barometric pressure rise (or even a door slamming) an the rapid rose in pressure due to an arc. The sensors of FIGS. 4, 5, and 6 may equally be amenable to the use of all three of the above techniques for discrimination.

The pressure sensors of FIGS. 3 through 6 are easily configured for BIT and BIST, although the circuit details for including BIT and BIST have been explicitly illustrated in FIG. 5. Further, these sensors can easily connect to any type of network or central processing system or an embedded system for protecting power switchboards against arcing faults. They fit into either a centralized architecture such as the star-topology connections or a distributed architecture such as a network.

Figure 7:
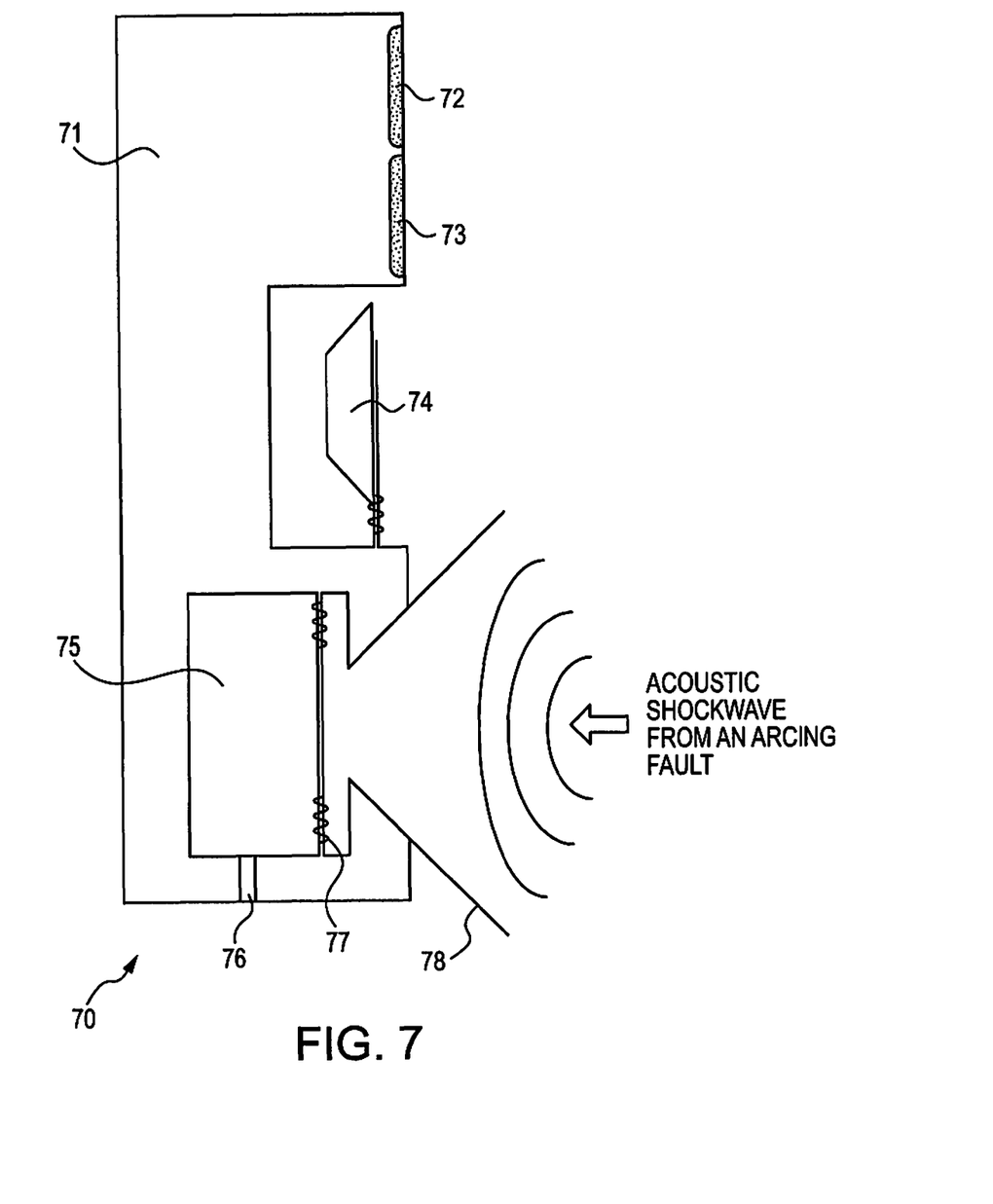
FIG. 7 is a diagram of an example of an integrated sensor module according to the principles of the present application.

FIG. 7 illustrates an example of an integrated sensor module. FIG. 7 shows one possible mechanical orientation and location of the detectors. Integrated sensor module 70 may be a single MEMS device or may be built-up from individual detectors and circuits. The integrated sensor module 70 incorporates photodiode detector 73 for detecting the bright flash from an arcing fault. Also incorporated into integrated sensor module 70 is a pressure sensor composed of entry nozzle 78, diaphragm 77, ambient chamber 75 and pressure bleed tube 76. Note that entry nozzle 78 may be part of substrate 71 or built into the packaging around substrate 71. Also incorporated into integrated sensor module 70 is accelerometer 74. Accelerometer 74 detects accelerations not associated with pressure changes, and may be micromachined from bulk silicon or other substrate material with sufficient air vents to keep pressure on both sides of the bulk mass during pressure changes. Accelerometer 74 is shown oriented in the same plane as the diaphragm 77. Substrate 71 contains and supports the detectors, and processing core 72. Processing core 72, whether it is a microcontroller, digital signal processor (DSP), programmable logic, or fixed binary logic, may read all the detectors, condition (e.g., perform filtering, timing, threshold comparisons) and fuse the data, and make a decision as to the validity of the detection. For running self tests, both BIT and BIST, the sensor either has algorithms in a multitasking environment or has a separate microcontroller.

Figure 8:
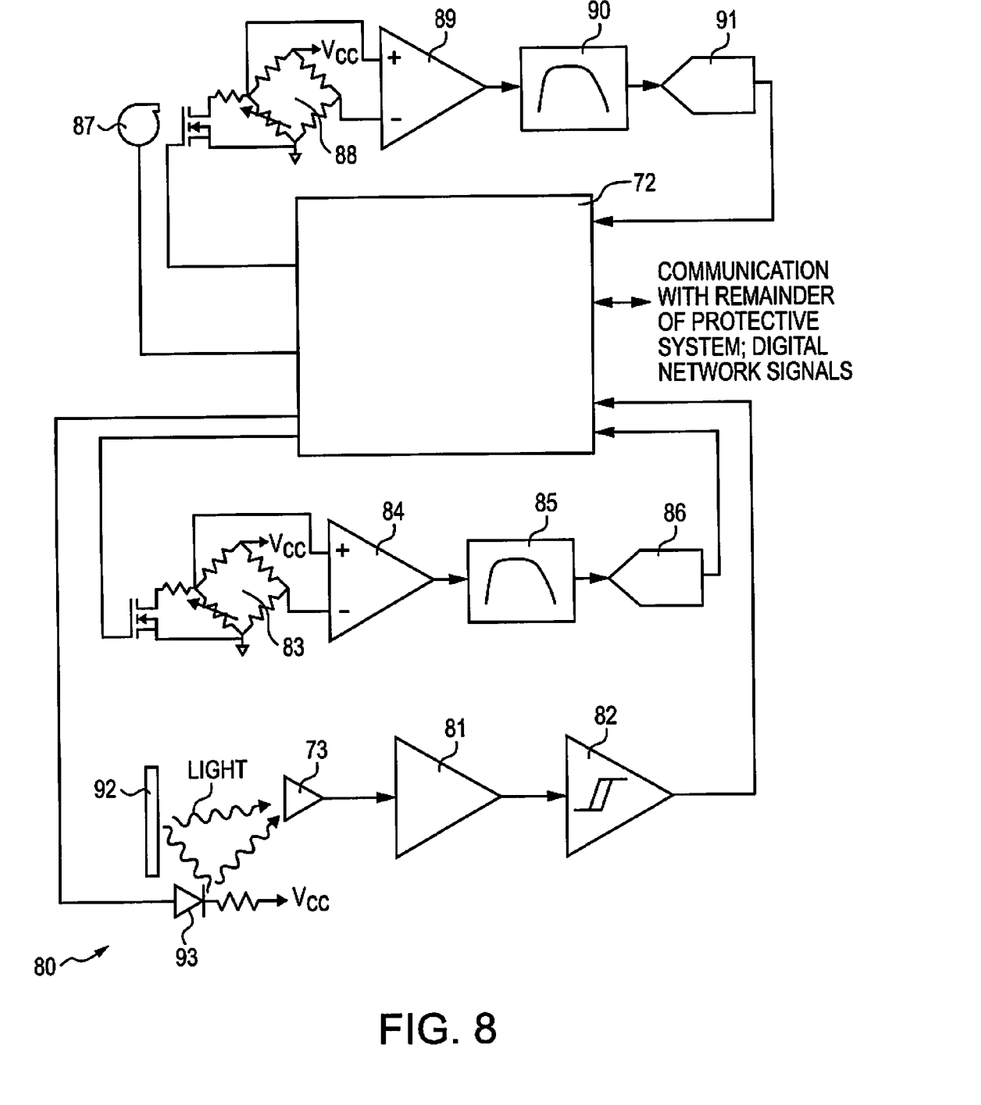
FIG. 8 is a diagram of an electrical schematic of the integrated sensor module of FIG. 7.

FIG. 8 is a diagram showing electrical schematic 80 of the electrical circuit for integrated sensor module 70 shown in FIG. 7. Light from the arc impinges on photodetector 73, which is connected to amplifier 81, which connects into threshold comparator 82 and then on to processing core 72. The sensor window 92 protects the photodetector 73 and allows the reflection of light from an impeded Light Emitting Diode (LED) 93 into the photodetector 73 for Built-in-self-test (BIST). In a similar fashion, acceleration-activated strain gauge 83 connects to difference amplifier 84 which is connected to filter 85, which in turn connects to analog-to-digital converter (ADC) 86 which provides a digital signal to processing core 72. Likewise, pressure-activated strain gauge 88 connects to difference amplifier 89, which connects to filter 90 which is in turn connected to analog-to-digital converter 91. Note that pressure pump 87 is used to test pressure activated strain gauge 88. Further note that both the pressure detector and accelerometer may be simplified by using switches with debounce circuitry in place of the combination of strain gauges, amplifiers, filters and ADCs.

A sensor may send messages to the system, which may contain a central panel and circuit breakers, to indicate a valid detection indication. A sensor may also send messages to the system that indicate a problem or a self test result. The sensor messages need a number of elements to be effective and efficient: a sensor identification tag, time of message or occurrence, and message type (such as detection, self test result, interrogation response, or anomaly report). A sensor may be programmed with its unique identification tag. Programming may be through any number of means: switches, flash memory, or predefined IP address.

A sensor may incorporate an array of integrated detectors including photodetectors, pressure detectors, accelerometers, and electronic conditioning and control circuitry onto one substrate or circuit board or module. A single processing core, whether it is a microcontroller, DSP, programmable logic, or fixed binary logic, may read all the detectors, condition and fuse the data, and make a decision regarding the validity of the detection.

There are at least two options for self test circuitry. Built-in test (BIT), which may be manually initiated, and Built-in Self Test (BIST), which may be automatically run, are both self tests of the protective system. Both may run similar types of operations and tests. In general, self test, either BIT or BIST, should exercise individual sensors, to isolate and to identify failed components and detectors.

Self test of a photosensor may be initiated simply by shining a light into the photodetector 73, as shown in FIG. 8. The self test imitates an arcing fault through a self test light 93; the test can measure appropriate response to both a light pulse of appropriate duration (e.g., greater than 2 or 52 milliseconds) and to false alarm conditions where the light is too short to be indicative of an arcing fault. This circuitry can support tests of both the individual sensor and of the system. The sensor, as well as the entire system, should be in a state that will not trigger the opening of a circuit breaker during the self test.

Self test of a pressure sensor may be initiated simply by any number of means, including closing a circuit path around the switch in the pressure detector, using an auxiliary pressure pump, or mechanically pulsing the diaphragm, as shown in FIGS. 8. The self test imitates an arcing fault through a pressure indication; the test can measure appropriate response to both a pressure representing a shockwave of appropriate duration (e.g., greater than 1.8 milliseconds) and to false alarm conditions where the pressure pulse is too short to be indicative of an arcing fault. This circuitry may support tests of the individual sensor and/or tests of the system. The sensor, as well as the entire system, should be in a state that will not trigger the opening of a circuit breaker during the self test.

Figure 9:
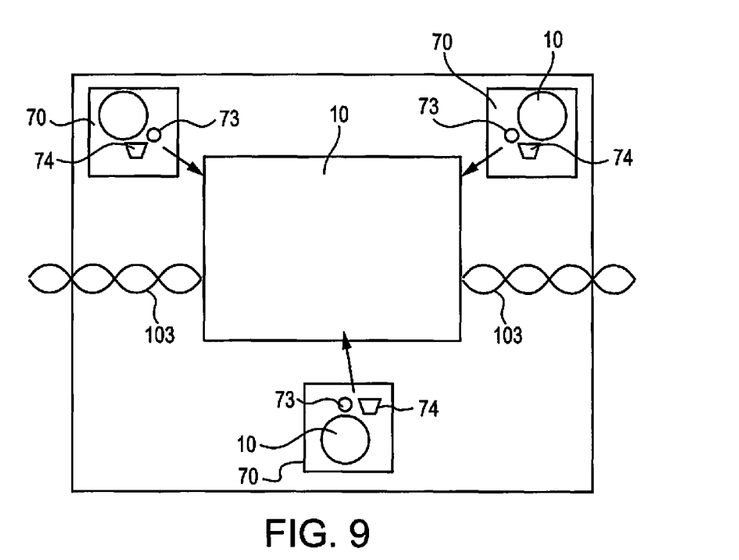
FIG. 9 is a diagram showing an example of multiple integrated sensor modules according to the principles of the present application.

FIG. 9 is a diagram showing one possible integrated architecture 100 of multiple sensor modules 70 that are individually illustrated in FIG. 7. Note that the principles of the present application may be applied to a wide variety of architectures 100, hence the specific integrated architecture shown in FIG. 9 is not intended to limit the scope of this application. Multiple sensor modules 70 each include photodetector 73, accelerometer 74 and pressure detector 101. Processing circuitry 102 may be a microcontroller, DSP, FPGA, discrete logic or an ASIC. Processing circuitry 102 receives the signal inputs from the individual detectors, conditions, filters, performs threshold comparisons fuses data and validates conditions for an arcing fault. Processing circuitry 102 also communicates with the system network and contains the self test circuitry (not shown). Cable connections 103 connect processing circuitry 102 with the digital network for communications with the protection system.

Figure 10:
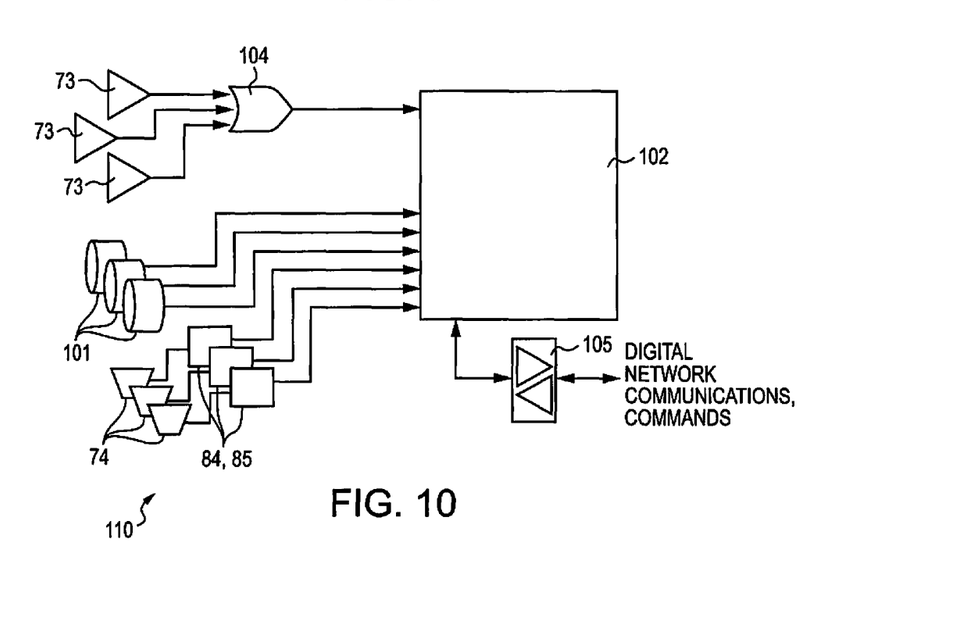
FIG. 10 is a diagram showing an electrical schematic of the multiple integrated sensor modules of FIG. 9

FIG. 10 is a diagram showing general schematic 110 of the electrical circuit for the integrated architecture 100 of FIG. 9. Pressure detectors 101 are connected to processing circuitry 102. Individual pressure detector inputs interrupt the processing to indicate the arrival of the acoustic pressure wave. Timers also may be digital filters for the signal generated by pressure detectors 101. Photodetectors 73 are connected to logic gate 104. Logic gate 104 may be an "OR gate" or may possibly be a different Boolean combination of the signals from photodetectors 73. Accelerometers 74 may be connected to signal conditioning 84, 85, 86 and to the processing circuitry 102. Differential transceiver 105 provides communications between microcontroller 102 and the digital network.

Integrated architecture 100, or a variant thereof, may provide information indicative of the direction, distance, and location of an arcing fault. For locating an arcing fault, the light flash triggers a timer within the processing circuitry to time the arrival of the shock sound wave at the pressure detectors. The time it takes between the flash and the detection of the pressure wave is the time of flight and gives the distance to the arcing fault. The difference in arrival times of the sound pressure wave to two or three different pressure detectors indicates the direction to the arcing fault from the sensor. Two pressure sensors can give a single angle and direction in two dimensions. Three pressure sensors can give a solid angle and direction in three dimensions.

Figure 11:
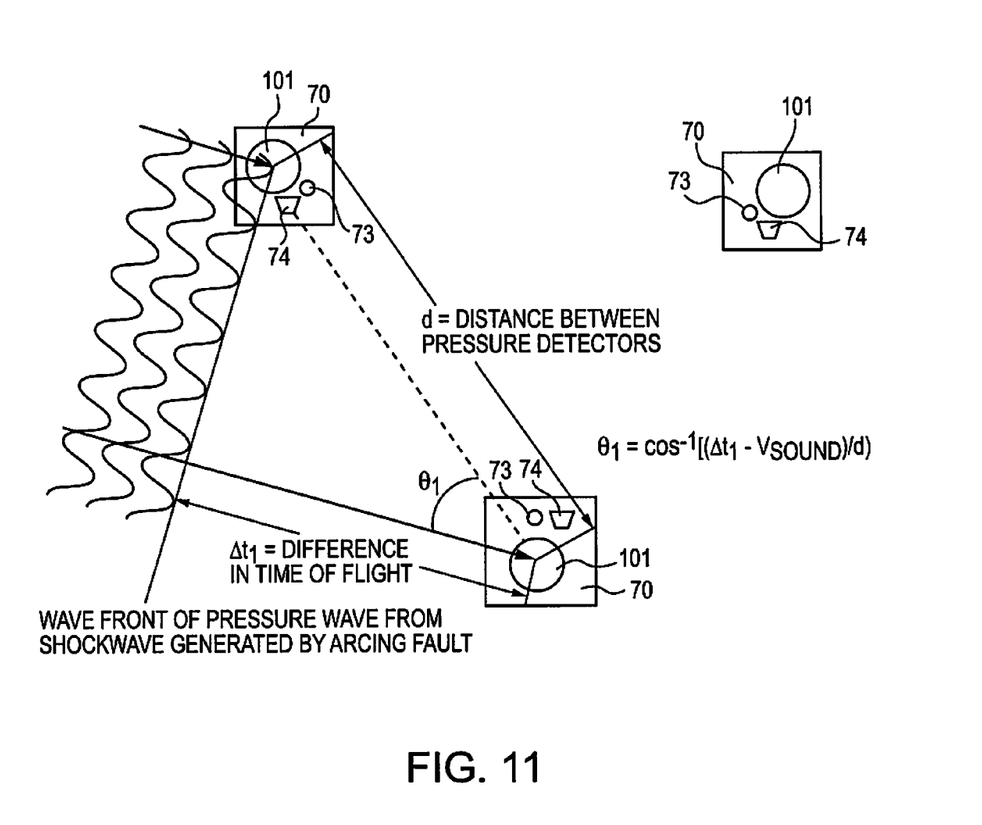
FIG. 11 is a diagram showing an example of a pressure shockwave encountering a detector array.

FIG. 11 is a diagram of one possible integrated architecture, and more specifically shows a configuration of pressure detectors illustrating how differences in time of flight can indicate the angle of the wave front. Note that the principles of the present application may be applied to a wide variety of integrated architectures and pressure detector configurations, hence the specific architecture and configuration of detectors shown in FIG. 11 is not intended to limit the scope of this application. The integrated sensor module 70 incorporates photodiode detector 73 for detecting the bright flash from an arcing fault. Also incorporated into integrated sensor module 70 is pressure sensor 101 and accelerometer 74. FIG. 11 shows that the angle $\Theta_1$ between the propagation vector of the pressure wave and the vector between the two pressures detectors can be computed from:

$$\Theta_1 = \cos^{-1}\left[\frac{(\Delta t_1 * V_{sound})}{d}\right],$$

where d is the distance between pressure detectors and $\Delta t_1$ is the difference in time of arrival of the pressure wave between two detectors.

Figure 12:
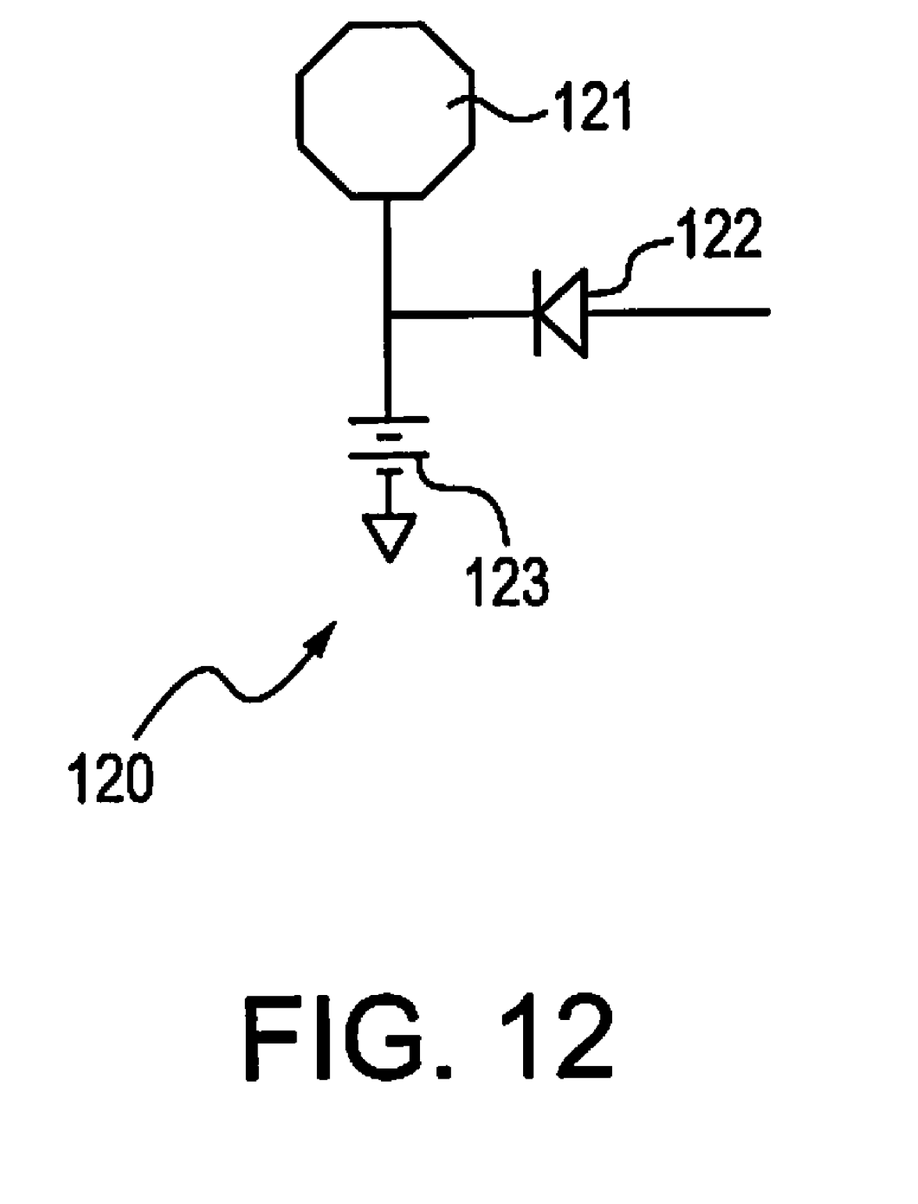
FIG. 12 is a diagram showing a schematic for power backup for a generic sensor.

Power for these sensors may come from either an input power source or a back-up power source. FIG. 12 is a diagram of power schematic 120, showing generic sensor 121, input power source 122 and backup power source 123. Input source 122 may be DC or AC electrical power and either may be wired to each sensor. Backup power source 123 would be used in case the power supplied on the cable should fail, and may be either battery backup or capacitor backup. An alternative form of backup power for the sensor network during power failure would be a battery system or an assured alternative power source. Note that the digital communications and the power may easily combine onto a cable with only two wires.

The integrated sensor design disclosed in this application uses multiple phenomenologies to define an event and increases probability of detection while simultaneously lowering the false alarm rate. More specifically, if one type of input is essentially independent of another, until a specific event occurs, then their probability of false alarm is a geometric series:

$$P_{system\ false\ alarm} = \pi P_i,$$

where the product is taken over the independent probabilities of false alarm for all i sensor phenomenologies.

If more independent phenomenologies are added to the system, then the system probability of false positive alarms decreases by multiplicative factors. Adding independent sensor phenomenologies to the system increases the discrimination of the critical events, which is the reason for the reduction in the rate of false positive alarms.

In operation, when an arcing fault occurs, both light and pressure pulses are generated. Light and pressure pulses are detected by photodetector(s) and pressure sensor(s), respectively.

Photodetection has several constraints to qualify as a potential arc detection. The detection must exceed a preset intensity threshold to trigger an indication of a potential arc. The indication must last, i.e., exceed the intensity threshold, for a preset amount of time (the typical range being between 2 and 52 milliseconds).

Pressure detection has several constraints to qualify as a potential arc detection. The detection must exceed a set differential pressure threshold to trigger an indication of a potential arc. The indication must last, i.e., exceed the intensity threshold, for a preset amount of time (the typical range being between 1.8 and 20 milliseconds).

Both types of indications, light flash and pressure, must occur nearly simultaneously before the system signals a valid detection. Once the system receives indications from both types of detectors in the same sensor module, then it may signal the opening of a circuit breaker, which should extinguish the arc fault. Considering the times already mentioned for either the photosensors or the pressure sensors, extinction of the arc must occur somewhere within 200 milliseconds of the first detection. This would be considered near the upper limit. It also provides some margin in time to discriminate the arcing fault and reduce potential false alarms from extraneous sources. Ultimately, shorter time to extinction is better because it reduces damage from combustion and melting.

When an air circuit breaker opens, an arc strikes between the contacts. The arc flash can eject from the breaker vent chute and be detected by the sensors in the protective system. The system that incorporates the integrated sensors of the types described herein need to allow for circuit breaker flashes by riding through the maximum duration allowed by code for these breaker flashovers. This is an important timing parameter for the protective system. The shortest time allowed for a 60 Hz power distribution switchboard controlled by air circuit breakers is two and one half cycles or 42.7 milliseconds. The shortest time allowed for a 50 Hz power distribution switchboard controlled by air circuit breakers is two and one half cycles or 50 milliseconds.

The timing for vacuum or SF6 circuit breakers is much shorter. These types of circuit breakers are enclosed within their own light-tight boxes. There is no path for stray light from contact arcs to reach the outside and the sensors of the protective system. Consequently, discrimination of a true arcing event may happen in the 2 millisecond range or less.

This application allows for these critical timing thresholds to be set as system parameters. Hardware registers or memory within the sensors, in the microcontroller, DSP, FPGA, discrete logic, or ASIC, may store these timing thresholds and use them in discriminating an arcing fault. The parameters are: the timeout duration for a photosensor (generally 2 to 52 milliseconds, but may be less than 1 to greater than 60 milliseconds), the timeout duration for a pressure sensor (generally 1.8 to 20 milliseconds, but may be less than 1 to greater then 40 milliseconds), and the maximum time duration allowed between a pressure sensor indication and a photosensor indication (up to 200 milliseconds).

The integrated sensor module described herein fits into a protection system that monitors, detects, and extinguishes arcing faults.

Messages from the sensors are sent to the central panel and the circuit breakers to indicate a valid detection indication. Sensors may also send messages to the central panel that indicate a problem or a self test result. The sensor messages need a number of elements to be effective and efficient: a sensor identification tag, time of message or occurrence, and message type (such as detection, self test result, interrogation response, or anomaly report). The interface modules for circuit breakers communicate to the central panel with similar message types. They would have the same format as messages from sensors.

The central panel sends and receives messages. It sends commands to both sensors and the circuit breaker interface modules; these commands include the following types: reset operation, health/status interrogation, time stamp to reset time within sensors or circuit breaker interface modules, begin normal monitoring by sensors within the protective system, begin self test, send results of self test, shut down operation (sent to malfunctioning sensors and circuit breaker interface modules), send detectors or sensor's analog reading. These commands may be either broadcast or addressed and sent to either specific sensors or specific circuit breaker interface modules. Its command messages have the following format: central processing identification tag, broadcast or address of sensor or circuit breaker interface module, command (as listed above).

The central panel also receives messages from sensors and circuit breaker interface modules. It records and logs these messages for later readout or transmission to a computer external to the protective system. The central panel may also communicate with the outside world through an internet connection, both to run operations and to send logs of events and operations.

Each sensor, if controlled by a local microcontroller or DSP or FPGA or ASIC or processing element, has a generic algorithm. The algorithm performs a number of tasks: it monitors the detectors, it reports its identification tag when requested, it performs self test and reports its results when requested, it reports analog values upon request, it checks arcing indications for valid conditions—usually a time duration and amplitude criteria—and reports the arc indication and the validity check.

Figure 15:
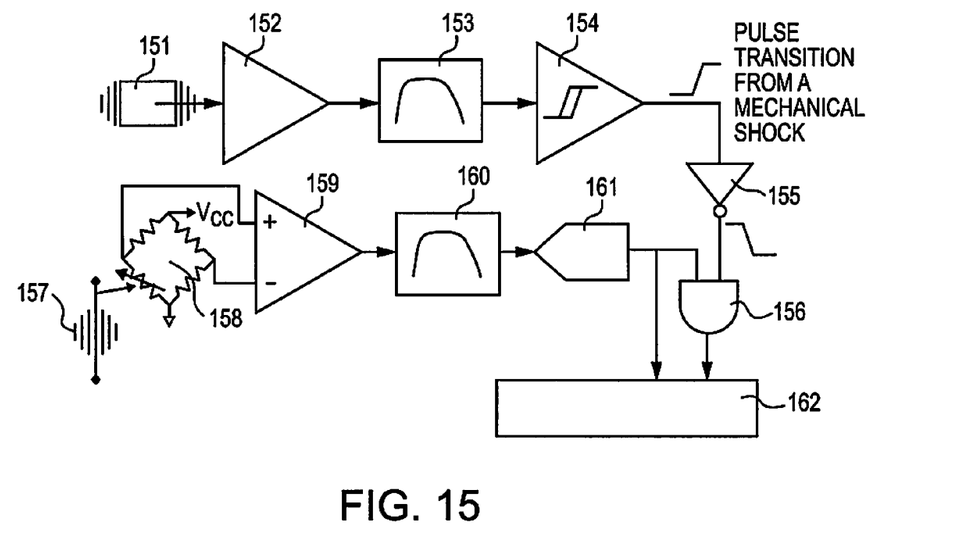
FIG. 15 is a diagram of one possible combination of accelerometer and pressure sensor.

FIG. 15 is a diagram showing an example of a main algorithm running a generic sensor. The primary operations are as follows. From power-up and/or reset operation 131, the process moves to operation 132 "protective monitoring operation." Operation 132 may indicate the existence of an arc, which then causes the process to move to operation 133 "check conditions for valid detection." Operation 133 may declare the conditions to be valid, in which case the process moves to operation 134 "prepare an indication message" which is then followed by sending a message to the circuit breakers. However, operation 133 may declare the conditions to be invalid, then the process moves to operation 135 "prepare an anomaly report", which is then followed by sending a message to the central panel. At a predetermined schedule or conditions, operation 132 may request for specific stimulus for self test, in which case operation 136 "turn on self test stimulus" is initiated. Note that multitasking may be used to run the self test on a signal processor, or the self test may be run on a separate processor or processing element (i.e., microcontroller, DSP, FPGA or ASIC).

Figure 13:
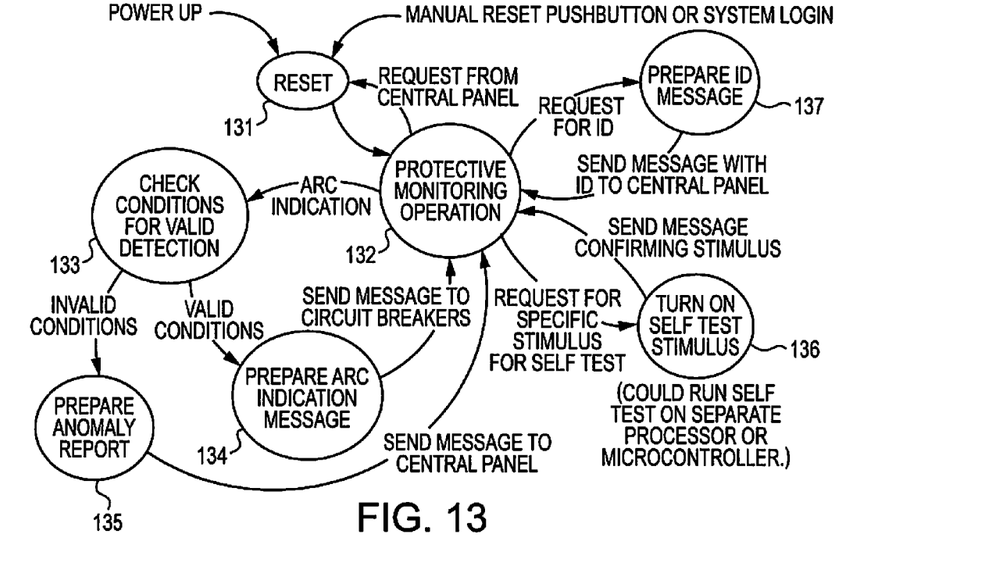
FIG. 13 is a flow chart of one possible algorithm for running a generic sensor.
Figure 14:
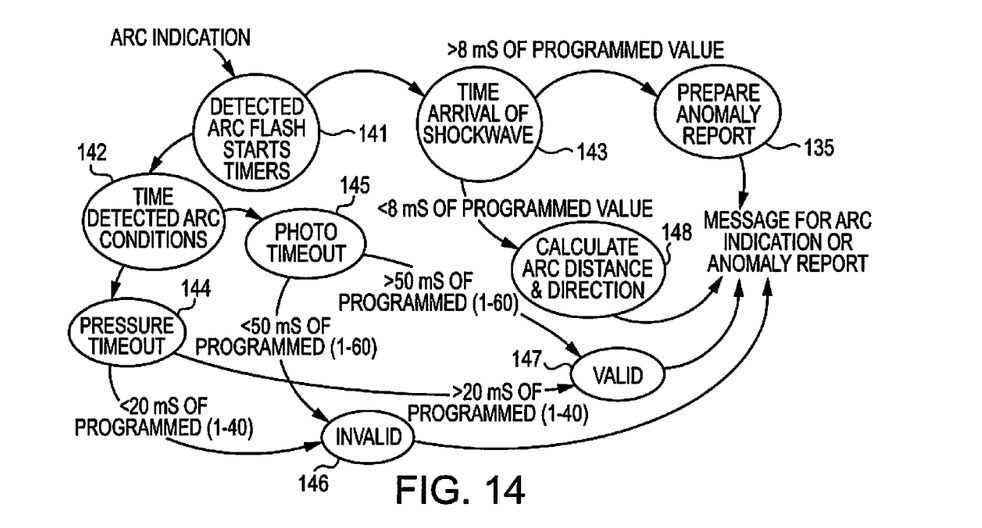
FIG. 14 is a flow chart of one possible algorithm for detecting and qualifying an arcing fault.

FIG. 14 shows an example of possible suboperations which accomplish operation 133 "check conditions for valid detection" from FIG. 13. After arc indication, operation 141 "detected arc flash starts timers" is initiated. From operation 141 the process moves to operation 142 "time detected arc conditions" and operation 143 "time arrival of shockwave." From operation 142 the process moves to operation 144 "pressure timeout" or operation 145 "photo timeout." From operation 144, if the pressure timeout is less than (for example) 20 ms (or a preprogrammed value) then the arc detection may be declared invalid as operation 146 and a message declaring such an invalid detection may be transmitted. Otherwise from operation 144, if the pressure timeout is greater than (for example) 20 ms or a preprogrammed value, then the detection may be declared valid as operation 147, and a message declaring such a valid detection may be transmitted. From operation 145, if the photo timeout is less than (for example) 50 ms (or a preprogrammed value) then the arc detection may be declared invalid as operation 146 and a message declaring such an invalid detection may be transmitted. Otherwise from operation 145, if the pressure timeout is greater than (for example) 50 ms or a preprogrammed value, then the detection may be declared valid as operation 147, and a message declaring such a valid detection may be transmitted. From operation 143, if the time arrival of the shockwave is greater than (for example) 8 ms or a preprogrammed value, then the process may move to operation 135 "prepare an anomaly report" and a message declaring the presence of an anomaly may be transmitted. Otherwise, from operation 143, if the time arrival of the shock wave is less than for example 8 ms or a preprogrammed value, then the process moves to operation 148 calculate arc distance and direction and an arc indication message may be prepared.

FIG. 15 outlines how the accelerometer input might interact with the pressure sensor to block mechanical shock from inappropriately triggering the pressure detector to indicate an arcing fault. IF mechanical shock is detected by accelerometer 151, this signal is then passed to amplifier 152 which is connected to filter 153. From there threshold comparator 154 is employed which sends a pulse to driver circuit 155 and on to Boolean circuit 156. Likewise, pressure detector diaphragm 157 sends pressure signal to pressure sensing element 158, which generates two voltage signals which are sent to difference amplifier 159. From here, the signal is passed to filter 160 which is connected to analog-to-digital converter 161, which is connected to both Boolean circuit 156 and processor element 162.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A sensor module for detecting arcing faults, said sensor module comprising:
   a photodetector,
   a pressure detector,
   an accelerometer,
   processing circuitry connected to each of said photodetector, said pressure detector and said accelerometer, and wherein said photodetector, said pressure detector, said accelerometer and said processing circuitry are mounted to a single substrate.

2. The sensor module of claim 1, wherein said processing circuitry comprises:
   photodetection circuitry comprising an amplifier connected to a threshold comparator,
   accelerometer processing circuitry comprising a difference amplifier connected to a filter and an analog-to-digital converter connected to said filter, and
   pressure detection processing circuitry comprising a difference amplifier connected to a filter and a analog-to-digital converter connected to said filter, wherein each of said photodetection circuitry threshold comparator, said accelerometer processing circuitry analog-to-digital converter, and said pressure detection processing circuitry analog-to-digital converter are connected to a microcontroller.

3. The sensor module of claim 2, wherein said microcontroller is a DSP.

4. The sensor module of claim 2, wherein said microcontroller is a FPGA.

5. The sensor module of claim 2, wherein said microcontroller is a ASIC.

6. A sensor for detecting arcing faults, said sensor comprising:
   a plurality of photodetectors,
   a plurality of pressure detectors,
   a plurality of accelerometers,
   processing circuitry connected to each of said photodetector, said pressure detector and said accelerometer.

7. The sensor of claim 6, wherein said microcontroller is a DSP.

8. The sensor of claim 6, wherein said microcontroller is a FPGA.

9. The sensor of claim 6, wherein said microcontroller is a ASIC.

* * * * *